United States Patent [19]

Hargunani et al.

[11] Patent Number: 4,524,603
[45] Date of Patent: Jun. 25, 1985

[54] METHOD OF IMPACT TESTING MOTOR VEHICLES

[75] Inventors: Ashok B. Hargunani, Farmington Hills; Clifford C. Chou, Canton; Harold G. Brilmyer, Grasse Pointe of Mich.

[73] Assignee: Ford Motor Company, Dearborn, Mich.

[21] Appl. No.: 529,821

[22] Filed: Sep. 6, 1983

[51] Int. Cl.³ .................... G01N 3/30; G01M 17/00
[52] U.S. Cl. .................................................. 73/12
[58] Field of Search ...................................... 73/12

[56] References Cited

U.S. PATENT DOCUMENTS 3,757,562  9/1973  Goldberg et al. ....................... 73/12

FOREIGN PATENT DOCUMENTS

| 2143540 | 3/1973 | Fed. Rep. of Germany | 73/12 |
| 2266830 | 10/1975 | France | 73/12 |
| 0072837 | 6/1979 | Japan | 73/12 |
| 0486235 | 12/1975 | U.S.S.R. | 73/12 |
| 0813158 | 3/1981 | U.S.S.R. | 73/12 |

OTHER PUBLICATIONS

Elsholz et al–Automobiltechnische Zeitschrift, vol. 77, No. 1, pp. 2-4, Jan. 1975.
Aston–IEETE Journal, vol. 6, No. 4, pp. 3-7, Jan. 1972.

Primary Examiner—Charles A. Ruehl
Attorney, Agent, or Firm—Daniel M. Stock; Clifford L. Sadler

[57] ABSTRACT

A method of determining crash deflection data for an automobile at a number of crash speeds of interest in which a single vehicle is impacted at a first speed and the energy absorbed in that impact is determined and the vehicle is impacted at a second, lower speed that results in a total vehicle energy absorption equivalent to that absorbed by the vehicle had it been initially impacted at a desired speed higher than the first speed.

4 Claims, 4 Drawing Figures

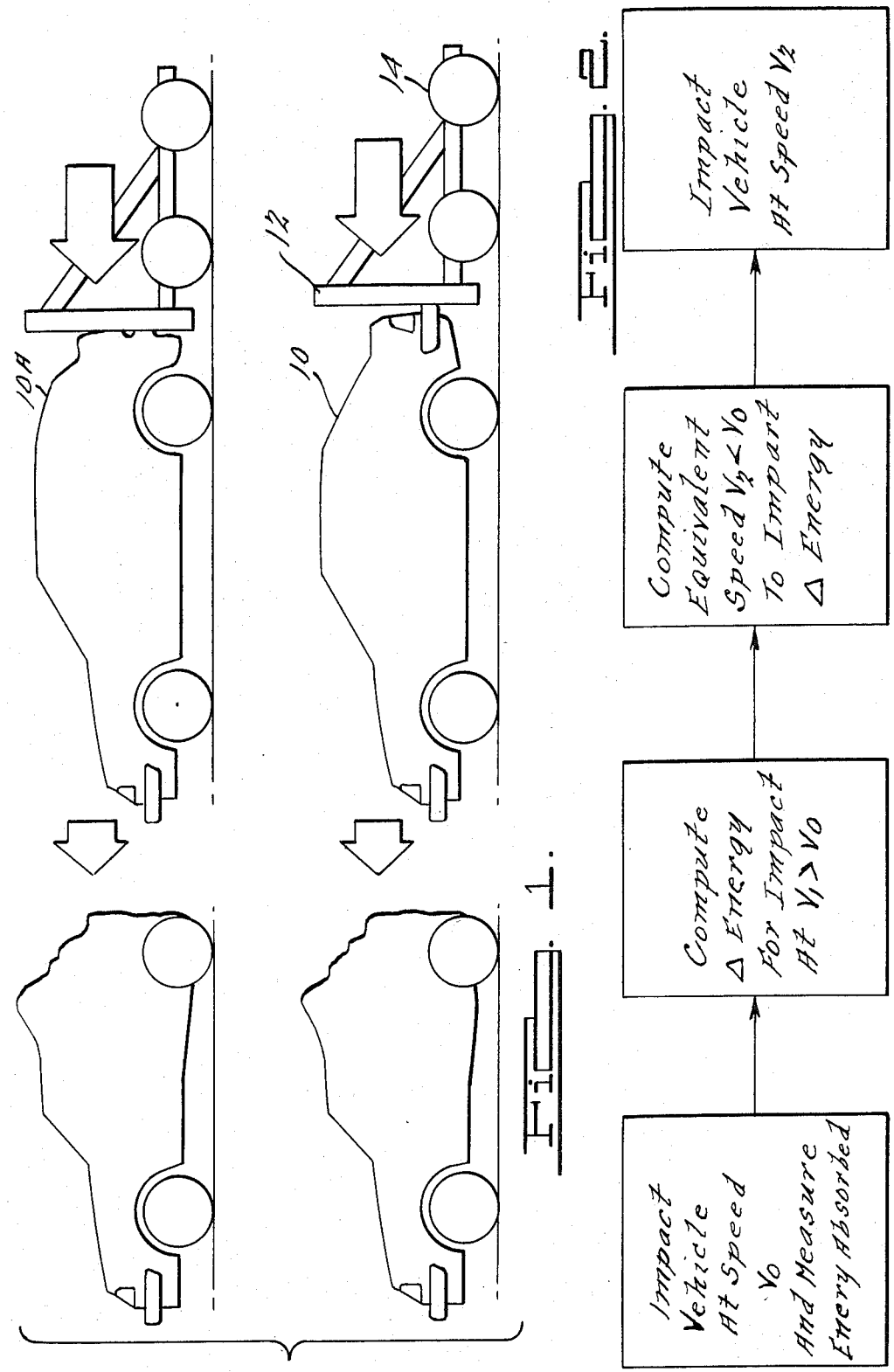

METHOD OF IMPACT TESTING MOTOR VEHICLES

BACKGROUND OF THE INVENTION

The present invention relates generally to automotive safety testing and, more specifically, to vehicle impact testing methods.

Compliance with government promulgated safety standards by the automotive industry has for some time necessitated the impact testing of vehicles at certain designated speeds. The fluidity of these requirements as well as the interest of the industry in test data generated through impact at different speeds has necessitated the conducting of extremely expensive testing programs in which a multiplicity of vehicles is crash tested to yield the requisite speed varying data.

Prior to the present invention, no acceptable substitute for this undesirably expensive testing has been found, although attempts have been made, e.g., that shown in U.S. Pat. No. 3,757,562 for testing scale models.

SUMMARY OF THE INVENTION

Responsive to the noted problem, the method of the present invention provides for utilizing a single vehicle in a procedure in which a series of impacts are effected to simulate successively higher impact speeds over a base impact speed.

According to the invention, a vehicle is crashed or impacted at a given speed; the energy absorbed by the vehicle structure at that speed is computed; the additional energy that would be absorbed at a higher speed is computed, together with the second impact speed necessary to impart that energy to the vehicle; and the vehicle is impacted at that second speed.

BRIEF DESCRIPTION OF THE DRAWINGS

The advantageous operation according to the invention method will be apparent to those skilled in the automotive safety arts upon reading the following description with reference to the accompanying drawings, in which:

FIG. 1 is a diagrammatic illustration of the invention testing method;

FIG. 2 is a chart of the method;

DESCRIPTION OF THE BEST MODE OF PRACTICING THE INVENTION

Figure 3:
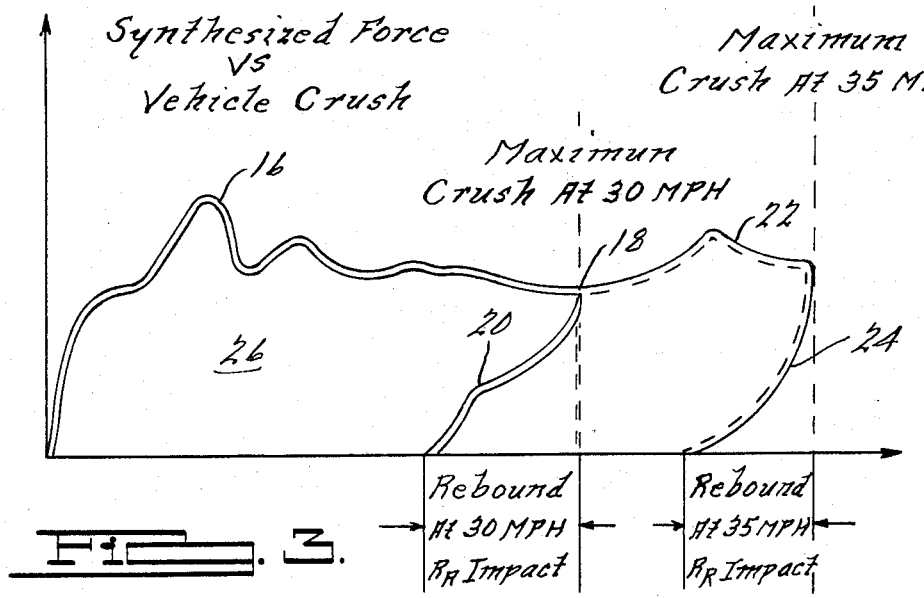
FIG. 3 is a graphical presentation of vehicle energy absorption characteristics.

Turning now to the drawings and, in particular, to FIG. 1 thereof, the fundamental result of practicing the method of the present invention is diagrammatically illustrated. In the lower portion of the drawing figure, an undamaged motor vehicle 10 is shown in abutting relationship with an impact barrier 12. The barrier 12 is shown schematically as a moving barrier having wheels 14, but the use of such a barrier is not necessary to the practice of the invention. Any stiff, flat impact producing device will suffice.

In the lower left portion of the drawing figure, the vehicle 10 is shown in the crushed configuration that it assumes upon impact with the barrier 12 at an elevated speed of interest, for example 35 mph.

In the upper portion of the drawing figure, another vehicle 10A is shown which is essentially identical to the vehicle 10 but which has been previously impacted by a barrier at some lower speed, for example 30 mph. As is illustrated, the vehicle 10A has been foreshortened a measurable amount by crushing. It has been found to be possible to recrash an impacted vehicle such as the vehicle 10A through barrier impact at a predictable lower speed to yield an end configuration equivalent to that produced through impact of an undamaged vehicle at a higher speed. The upper portion of FIG. 1 illustrates this phenomenon when compared to the lower portion of the drawing figure.

Figure 4:
FIG. 4 is a graphical chart presentation of the speed simulation of the invention method.

In FIGS. 2-4, the procedure followed in yielding this desirable result is further illustrated. As is shown by chart in FIG. 2, the equivalent speed recrash is effected by impacting the vehicle at a given speed and measuring the energy absorbed in the crash, computing the additional energy that would be absorbed in a higher speed crash, computing the impact speed necessary to impart the additional energy, and impacting the vehicle again at that computed speed.

In FIG. 3, a graphical showing is made of the energy absorption data utilized in the measurement and computational steps of the recrash procedure. The curve 16 of FIG. 3 is essentially a plot of the force imparted to the vehicle 10 or 10A against the resulting deflection. In a series of impacts such as that described in relation to FIG. 1, the maximum deflection of the undamaged vehicle 10 at 30 mph impact illustrated at point 18 may readily be determined through known instrumentation. Also so determined is the shape of the curve 16 described during the impact process as well as the shape of the rebound curve shown at 20 which represents the resilient return of nonyielded vehicle parts to a rest position after relaxation of the impact load.

On the right-hand side of the curve 16 of FIG. 3, an extended curve 22 and an associated rebound curve 24 are shown which represent an extrapolation of the crush characteristics of the vehicle 10 to yield the maximum deflection that would be experienced at 35 mph impact.

Given the test data of the curve 16, the area 26 within the curves 16 and 20 may be computed to yield the energy absorbed by the vehicle 10 undergoing a 30 mph barrier impact. The area under the curve 20 is also computed to yield the energy released by the impacted vehicle 10 in rebound. Using the energy conservation relationship $E = \frac{1}{2}MV^2$ and knowing the mass of the vehicle 10, the energy to be absorbed by the vehicle at 35 mph may next be computed; and then the difference between the computed value and the measured absorbed value may be utilized to compute the equivalent speed impact required to effect the energy transfer indicated.

As is best shown by the chart of FIG. 4, the difference between the energy absorbed at the higher speed as computed and the observed energy absorption of the lower speed impact must be modified to account for the effect of rebound. This consists of adding the rebound energy observed and computed as the area under the curve 20 to the difference or recrash energy. Computation of the impact speed required to yield this recrash energy transfer may then be accomplished through the energy conservation relationship. It has been shown that recrashing vehicles at speeds so determined has yielded final vehicle deformations substantially equivalent to those observed from the single impact of substantially identical vehicles at the higher desired speed.

What is claimed is:

1. A method of determining the deflection characteristics of a vehicle resulting from subjecting the vehicle to impact with a flat, stiff barrier at a plurality of given speeds, the method comprising the steps of:

A. subjecting the vehicle to a first such impact at a first speed;
   B. measuring the deflection characteristics of the vehicle after said impact;
   C. computing the observed energy absorbed by the vehicle as a result of said impact;
   D. computing the predicted energy to be absorbed by the vehicle through such an impact at a second, higher speed;
   E. computing the difference between said predicted energy and said observed energy;
   F. computing the equivalent speed at which the vehicle must be impacted to transfer energy equivalent to said difference; and
   G. subjecting the vehicle to such impact at said equivalent speed.

2. A method as defined in claim 1, wherein the measuring step comprises observing and recording the variation of the deflection of the vehicle with the load imposed thereon and the first computing step comprises integrating the curve describing said variation.

3. A method as defined in claim 1, wherein said first computing step includes reducing the observed energy absorbed by that amount of energy released through rebound of the vehicle upon relaxation of the load producing said first impact.

4. A method as defined in claim 2, wherein said first computing step includes reducing the observed energy absorbed by that amount of energy released through rebound of the vehicle upon relaxation of the load producing said first impact.

* * * * *